(12) United States Patent
Mozurkewich et al.

(10) Patent No.: US 11,440,452 B2
(45) Date of Patent: Sep. 13, 2022

(54) COMPOSITE SEAT BACK

(71) Applicant: Ford Global Technologies, LLC, Dearborn, MI (US)

(72) Inventors: Kevin Mozurkewich, Milford, MI (US); Travis Pierce, Ferndale, MI (US); Bradley Bysouth, South Lyon, MI (US); Adarsh Gupta, Southgate, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/081,804

(22) Filed: Oct. 27, 2020

(65) Prior Publication Data
US 2022/0126734 A1 Apr. 28, 2022

(51) Int. Cl.
*B60N 2/68* (2006.01)
*B60N 2/22* (2006.01)

(52) U.S. Cl.
CPC .......... *B60N 2/682* (2013.01); *B60N 2/2213* (2013.01); *B60N 2/686* (2013.01); *B60N 2205/30* (2013.01)

(58) Field of Classification Search
CPC ...... B60N 2/682; B60N 2/686; B60N 2/2213; B60N 2205/30
USPC .................................................. 297/452.18
See application file for complete search history.

(56) References Cited

U.S. PATENT DOCUMENTS

| 5,029,942 | A | * | 7/1991 | Rink | B60N 2/806 297/452.18 |
| 5,918,943 | A | * | 7/1999 | Mitschelen | B60R 22/26 297/452.18 |
| 6,767,067 | B2 | | 7/2004 | Fourrey et al. | |
| 8,267,479 | B2 | * | 9/2012 | Yamada | B60N 2/682 297/452.18 |
| 8,550,563 | B2 | * | 10/2013 | Nasshan | B60N 2/22 297/452.18 |
| 8,894,154 | B2 | * | 11/2014 | Kulkarni | B60N 2/686 297/452.1 |
| 9,254,770 | B2 | * | 2/2016 | Nuyan | B29C 65/02 |
| 10,106,068 | B2 | * | 10/2018 | Line | B60N 2/68 |
| 2004/0227389 | A1 | * | 11/2004 | Yoshida | B60N 2/64 297/452.18 |

(Continued)

FOREIGN PATENT DOCUMENTS

CN 210126464 U 3/2020

*Primary Examiner* — David R Dunn
*Assistant Examiner* — Tania Abraham
(74) *Attorney, Agent, or Firm* — Vichit Chea; Price Heneveld LLP

(57) ABSTRACT

The present disclosure is directed to a seat back frame that has a composite body. The composite body includes a first side member and a second side member positioned on opposite sides of the composite body. The first and second side members include a recliner assembly at a lower end of each member. Each recliner assembly includes a first bracket, a second bracket, and a recliner sub-assembly. Each recliner assembly is welded or otherwise coupled to an extension that extends away from the recliner assembly along a respective side of the composite body. The extension may be stamped steel having a first end that is closer to the recliner assembly and a second end that is spaced from the recliner assembly. The first end of the extension has a width that is greater than a width of the second end.

17 Claims, 9 Drawing Sheets

(56) References Cited

U.S. PATENT DOCUMENTS

| | | | |
|---|---|---|---|
| 2005/0168041 A1* | 8/2005 | Glance | B60N 2/68 297/452.18 |
| 2012/0169107 A1* | 7/2012 | Sakkinen | C09J 5/06 297/452.18 |
| 2012/0223563 A1* | 9/2012 | Zimmermann | B60N 2/818 297/391 |
| 2017/0028891 A1* | 2/2017 | Seibold | B29C 45/14475 |

* cited by examiner

COMPOSITE SEAT BACK

BACKGROUND

Technical Field

The present disclosure is directed to a composite and metal hybrid seat back frame.

Description of the Related Art

Vehicles include seats that allow an occupant to sit comfortably and safely in the vehicle. Many seats include a seat base and a seat back that are made of a seat frame and foam around the seat frame to provide adequate cushioning to the occupant. The seat back includes a reclining mechanism that allows the seat back to recline with respect to the seat base. The seat frame is usually made of metal alloys, such as steel onto which the reclining mechanism can be attached. Although the seat frame is usually made of steel, there are some shortcomings associated with steel. For instance, the manufacturing cost of steel-made seat frames can be high and warrants specialized processes, such as welding, stamping, and involves several assembling steps that further increase the manufacturing cost. Moreover, steel-made seat frames are heavy, which increases the overall weight of the vehicle.

BRIEF SUMMARY

The present disclosure is directed to a composite and hybrid seat back frame that is made of different materials, which allow a lighter seat back frame while meeting strength and durability goals. The seat back of the present disclosure has a composite body with metal inserts. The metal inserts allow the composite body to attach to a mounting frame.

The seat back frame includes a first side member and a second side member positioned on opposite sides of a composite body. The first side member and the second side member include a recliner assembly at a lower end of each of the first side member and the second side member. Each recliner assembly includes a first bracket, a second bracket, and a recliner sub-assembly. Each recliner assembly is welded or otherwise coupled to an extension that extends away from the recliner assembly along a respective side of the composite body. The extension may be stamped steel having a first end that is closer to the recliner assembly and a second end that is spaced further away from the recliner assembly. The first end of the extension has a width that is greater than a width of the second end of the extension.

In some embodiments, the first side member and the second side member are over-molded with a composite material of the composite body. The composite body includes an upper body region that extends over the second ends of the extensions of both the first and second side members. The upper body region is coupled to a first and second body member that are separated from each other by an opening. The first and the second body members are a part of the first and second side members. The composite body also includes a lower body region that extends between and is coupled to the first and second body members. In addition, the composite body includes a plurality of ribs or other support structures that can be formed in the opening between the first and second body members.

The hybrid seat back frame includes a first surface that typically faces a dashboard and a second surface that is opposite to the first surface. The second surface of the hybrid seat back frame can include a trim trench around an outer edge of the seat back frame. This trim trench can significantly reduce the manufacturing cost and assembly time to construct the seat.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
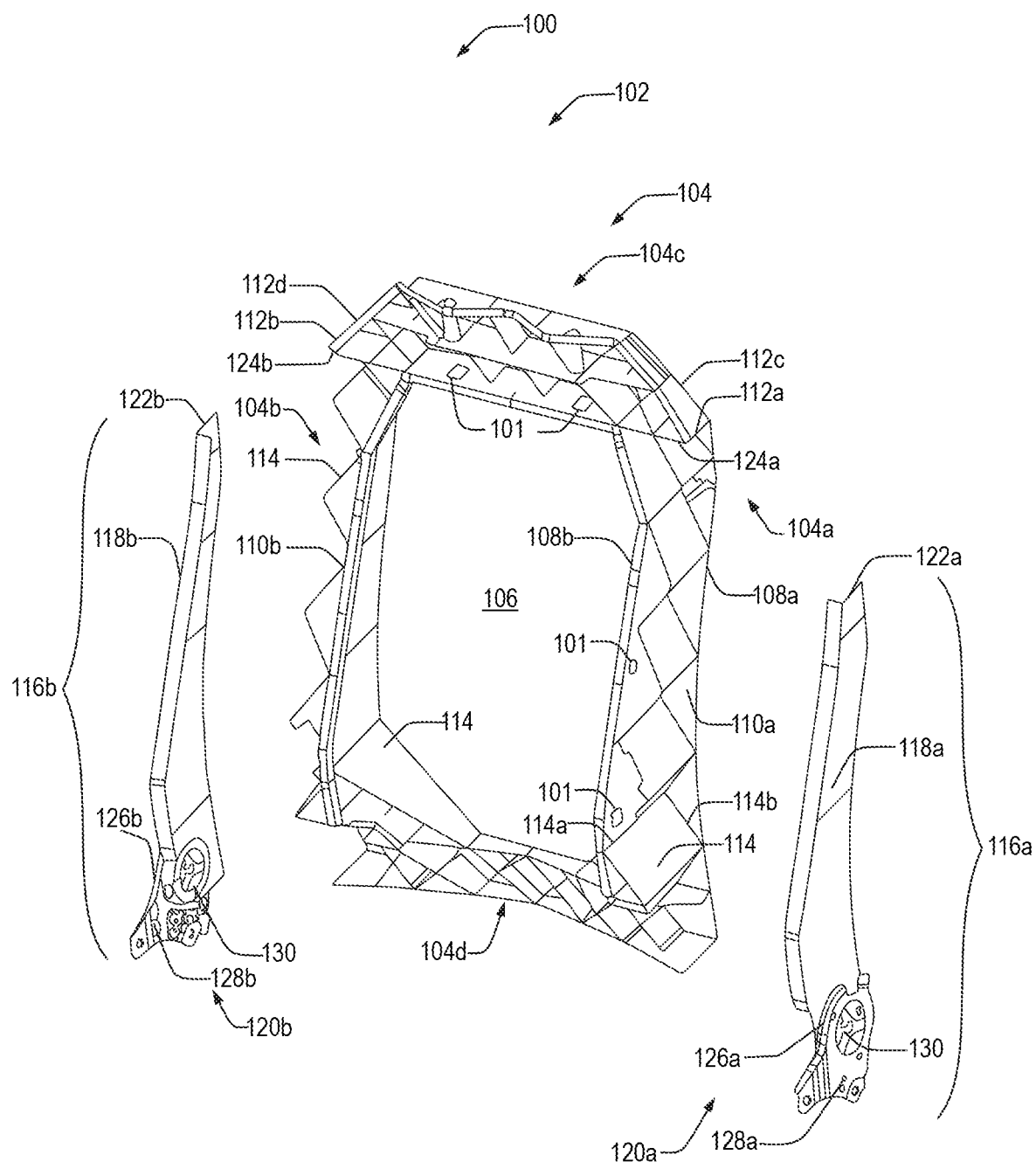
FIG. 1A illustrates an exploded view of a seat back in accordance with an embodiment of the present disclosure.
Figure 1B:
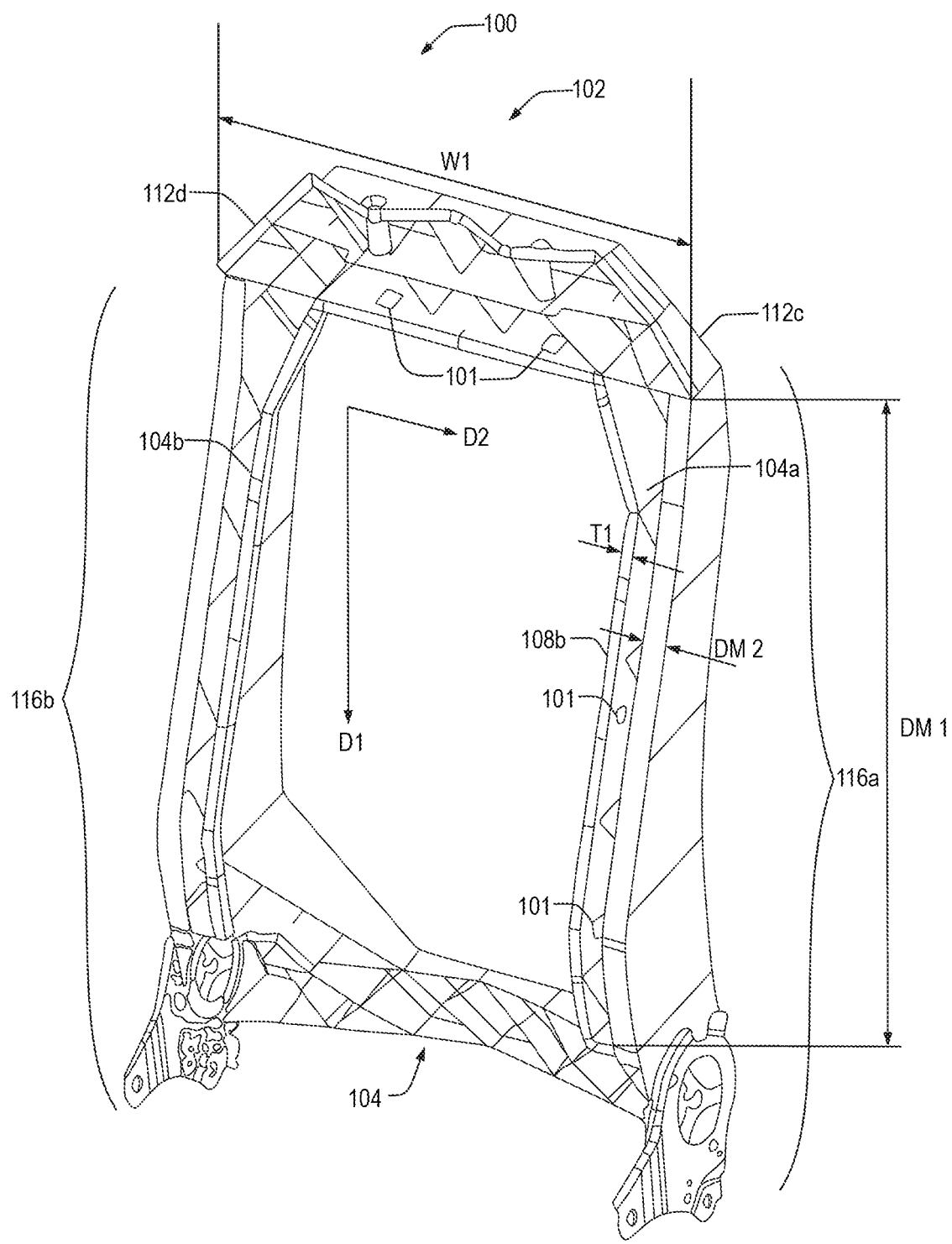
FIG. 1B illustrates an assembled view of the seat back of FIG. 1A.

FIGS. 1A and 1B illustrate different views of a seat back 102 of a device 100 in accordance with one scenario of the present disclosure. Specifically, FIG. 1A illustrates an exploded view of the seat back 102 while FIG. 1B illustrates an assembled view of the seat back 102. The device 100 can be installed inside a vehicle (not shown) to provide a seat to an occupant inside the vehicle. The device 100 is a vehicle seat that includes other components, such as a seat base and a mounting frame. The seat back 102 is used to support a back portion of the occupant sitting on the vehicle seat. The seat back 102 also acts as a support structure on which upholstery can be applied after the vehicle seat is manufactured and installed inside the vehicle.

The seat back 102 includes a composite body 104 that forms a major portion of the seat back 102. The composite body 104 is made from a material that can be lightweight while at the same time, has adequate strength and durability to be used in the vehicle. The material can be composed of polyethylene terephthalate or high-density polyethylene. The composite body 104 is made of a first side 104a and a second side 104b that together define a first central opening 106 of the composite body 104. In an example, the first side 104a and the second side 104b extends along a length of the composite body 104. As may be understood, a length of the first side 104a and the second side 104b is determined based on different parameters, such as the height of the vehicle's ceiling, level of a floor on which the vehicle seat is mounted, which in turn determines a height at which the occupant sits, and the like.

As shown in FIG. 1B, the first side 104a has a first dimension DM1 in a first direction D1 and a second dimension DM2 in a second direction D2. The first dimension DM1 defines a height of the composite body 104 while the second dimension DM2 defines a thickness of the first side 104a. As shown, the first dimension DM1 is greater than the second dimension DM2.

Each of the first side 104a and the second side 104b includes a back wall 108a and a support wall 108b that define a structure of the first side 104a and the second side 104b. In the illustrated example, the back wall 108a and the support wall 108b form an L-shaped profile. As shown in FIG. 1B, the support wall 108b may have a thickness T1. In one example, the back wall 108a may have a thickness T1. The thickness T1 can be determined based on a load that the seat back 102 will bear when the seat back 102 is installed inside the vehicle.

The back wall 108a and the support wall 108b form recesses therein that can accommodate different components of the seat back 102 that will be explained in subsequent paragraphs. For instance, as shown in FIG. 1B, the back wall 108a and the support wall 108b of the first side 104a forms a first recess 110a while the back wall 108a and the support wall 108b of the second side 104b forms a second recess 110b. Also, the support wall 108b includes grooves 101 that allow mounting of other components of the seat back 102, such as mounting assemblies, thereon.

The seat back 102 also includes a plurality of ribs 114 housed in the recesses 110a and 110b that provide structural rigidity to the first side 104a and the second side 104b. Each of the plurality of ribs 114 includes a first edge 114a and a second edge 114b, adjacent to the first edge 114a. As shown in FIG. 1A, the L-shaped profile of the back wall 108a and the support wall 108b allow mounting of the plurality of ribs 114. For instance, the first edge 114a of each of the plurality of ribs 114 is attached to the support wall 108b while the second edge 114b is attached to the back wall 108a. Since each of the plurality of ribs 114 is connected to both the back wall 108a and the support wall 108b, the plurality of ribs 114 provides structural support to the support wall 108b and the back wall 108a. Further, the plurality of ribs 114 is attached to the support wall 108b and the back wall 108a to form a diamond-shaped profile that extends along a complete length of the first side 104a and the second side 104b. During operation, the plurality of ribs 114 facilitates the first side 104a and the second side 104b to support the load of the occupant.

The seat back 102 includes a top side 104c with a first end 112a and a second end 112b, thus defining an upper region of the seat back 102. The top side 104c at the first end 112a is coupled to one end of the first side 104a of the composite body 104 and at the second end 112b to one end of the second side 104b and extends there between. As shown in FIG. 1B, the top side 104c defines a width W1 of the seat back 102. In an example, portions of the upper region extend along the width W1 from the points the top side 104c is coupled to the first side 104a and the second side 104b to create a first overhang 112c and a second overhang 112d as shown in FIGS. 1A and 1B. The overhangs 112c, 112d are present to support the components, described below, that are attached to the first side 104a and the second side 104b of the composite body 104 of the seat back 102. The overhangs may be formed during an over molding process to form or assemble the seat frame.

The seat back 102 also includes a bottom side 104d that is attached to other ends of the first side 104a and the second side 104b extending there between and positioned opposite to the top side 104c. The bottom side 104d forms a side of the central opening 106. The bottom side 104d also forms a base of the seat back 102 and is proximate to the seat base (not shown) of the vehicle seat. In one example, the bottom side 104d has similar construction like the first side 104a including the back wall 108a, and the support wall 108b.

In an embodiment, the seat back 102 includes assemblies that couple the composite body 104 to different parts of the vehicle seat. For instance, the seat back 102 includes a first recliner support assembly 116a and a second recliner support assembly 116b that are installed on the first side 104a and the second side 104b, respectively, of the composite body 104. The recliner support assemblies 116a and 116b are installed inside the first recess 110a and the second recess 110b, respectively. Further, each of the recliner support assemblies 116a and 116b has extensions and recliner assemblies. For instance, the first recliner support assembly 116a includes a first extension 118a and a first recliner assembly 120a while the second recliner support assembly 116b includes a second extension 118b and a second recliner assembly 120b. In an example, the extensions 118a, 118b, and the recliner assemblies 120a, 120b are joined using different coupling techniques, such as welding.

The first extension 118a and the second extension 118b form a major portion of the recliner support assemblies 116a and 116b. When assembled, the first extension 118a and the second extension 118b are housed in the first recess 110a and the second recess 110b, respectively. The extensions 118a, 118b are housed in such a manner that an upper end 122a of the first extension 118a and an upper end 122b of the second extension 118b face and abut a bottom surface 124a of the first overhang 112c and a bottom surface 124b of the second overhang 112d, respectively.

The first extension 118a and the second extension 118b, in different embodiments, can have different dimensions in relation to the dimension of the first side 104a and the second side 104b of the composite body 104. In an example, the first extension 118a and the second extension 118b are less than half the dimension of the first side 104a and the second side 104b, respectively. In another example, the dimensions of the first extension 118a and the second extension 118b are less than one-third of the dimension of the first side 104a and the second side 104b, respectively.

Construction of the first recliner assembly 120a and the second recliner assembly 120b is now described. The first recliner assembly 120a and the second recliner assembly 120b are formed of different components and sub-assemblies. For instance, the first recliner assembly 120a and the second recliner assembly 120b include a first bracket 126a and a first bracket 126b, respectively. The first brackets 126a, 126b allow the first recliner assembly 120a and the second recliner assembly 120b to couple with the extensions 118a and 118b, respectively. In addition, the first recliner assembly 120a and the second recliner assembly 120b include a second bracket 128a and a second bracket 128b, respectively. The second brackets 128a, 128b allow the first recliner assembly 120a and the second recliner assembly 120b to couple with the seat base. The first brackets 126a, 126b, and the second brackets 128a, 128b are coupled in such a way that the first brackets 126a, 126b can rotate with respect to the second brackets 128a, 128b. The first brackets 126a, 126b, and the second brackets 128a, 128b can rotate with respect to each other to allow the seat back 102 to recline with respect to the seat base as per the occupant's preference.

The first recliner assembly 120a and the second recliner assembly 120b also include a sub-assembly that allows the first brackets 126a, 126b to rotate with respect to the second brackets 128a, 128b. In an example, the first recliner assembly 120a and the second recliner assembly 120b include a puck or a recliner gear system 130 that rotatably couples the first brackets 126a, 126b, and the second brackets 128a, 128b. The recliner gear system 130 includes a plurality of recliner gears configured to rotate the second brackets 128a, 128b with respect to the first brackets 126a, 126b positioned there between and to lock or secure the seat back 102 in place once rotated to a selected position. In another example, the first recliner assembly 120a and the second recliner assembly 120b include a ratchet assembly (not shown in FIG. 1A) that imparts rotation motion between the first brackets 126a, 126b, and the second brackets 128a, 128b. In either scenario, the recliner assemblies 120a, 120b rotatably couples the first brackets 126a, 126b, and the second brackets 128a, 128b.

According to the present disclosure, the first recliner assembly 120a and the second recliner assembly 120b, which are coupled to the composite body 104, are made of materials, such as metals or alloys. The material used reduces the overall weight of the seat back 102. In addition, the use of such material enables the use of manufacturing processes that allow for quick manufacturing. In an example, the composite body 104 is manufactured on the first recliner assembly 120a and the second recliner assembly 120b by the over-molding process. In this process, the first extension 118a and the second extension 118b act as the substrate, and the composite body 104 is molded over on the first extension 118a and the second extension 118b. In another example, the composite body 104 can be built using the injection molding process, when the first extension 118a and the second extension 118b are stamped on the composite body 104. Further, since the first extension 118a and the second extension 118b are prefabricated to act as the stamping die, the stamping process does away with the need to build dedicated dies thereby making the process less complex and cost-effective.

Figure 2:
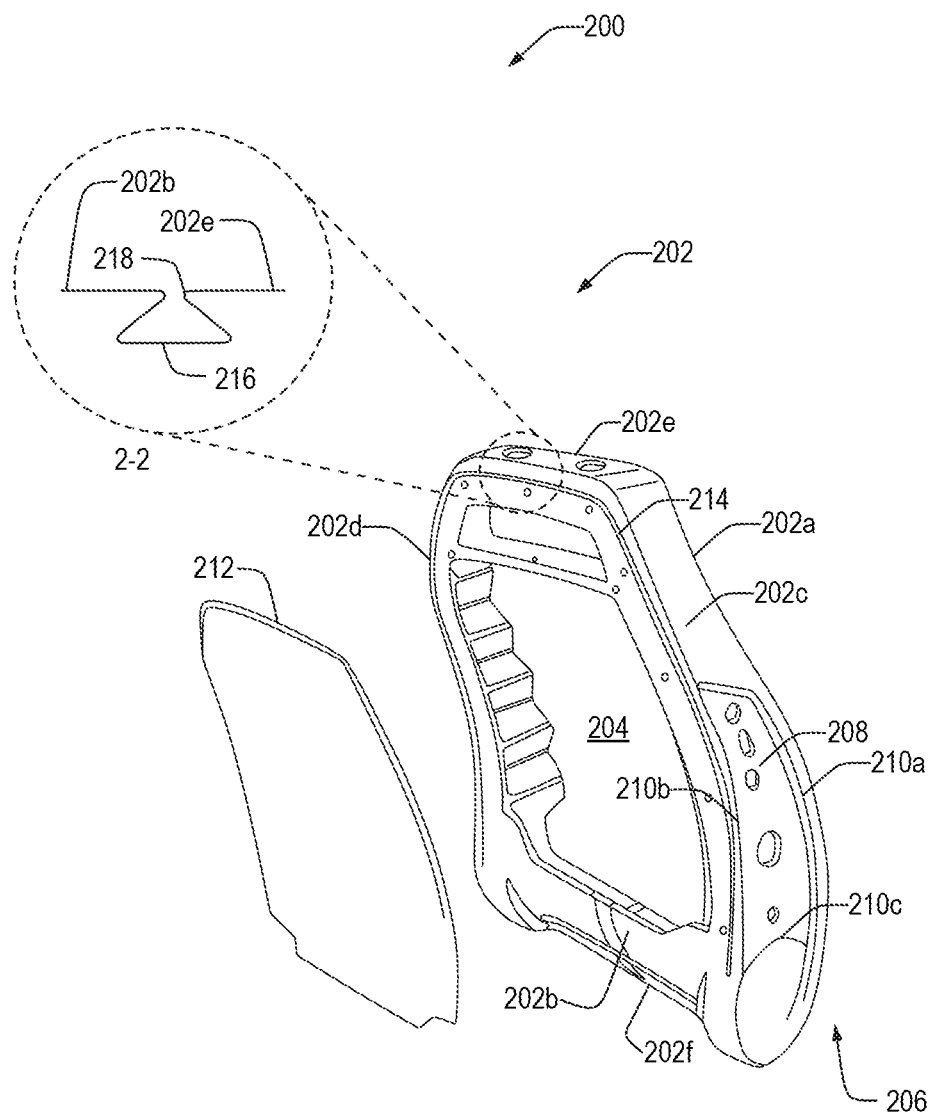
FIG. 2 illustrates an exploded view of a seat frame with a recess on sides in accordance with the present disclosure.

FIG. 2 illustrates an exploded view of another device 200 that includes a seat frame 202 in accordance with an embodiment of the present disclosure. The device 200 may have a similar construction as that of the device 100 as shown in FIGS. 1A, 1B. As shown, the seat frame 202 can be a seat back 102 (shown in FIGS. 1A, 1B). The seat frame 202 forms the main structure of the vehicle seat and includes different surfaces. For instance, the seat frame 202 includes a front surface 202a that faces a front fascia of the vehicle. In addition, the seat frame 202 includes a rear surface 202b that faces a direction, which is opposite to the front surface 202a. In an example, the rear surface 202b forms a back portion of the seat frame 202. The seat frame 202 also includes side surfaces, namely a first side surface 202c and a second side surface 202d that extends between the front surface 202a and the rear surface 202b. The seat frame 202 includes a first central opening 204 that extends between the front surface 202a, the rear surface 202b, the first side surface 202c, and the second side surface 202d. The seat frame 202 also includes an upper surface 202e which defines a top portion of the seat frame 202. The upper surface 202e, in an example, includes grooves to receive a head restraint of the vehicle seat. The seat frame 202 includes a lower surface 202f, which defines a bottom end of the seat frame 202.

According to the present disclosure, the seat frame 202 includes provisions to accommodate the components, discussed below, that couple the seat frame 202 with different portions of the vehicle seat. In one scenario, the first side surface 202c includes a recessed area 206 carved out from the first side surface 202c to accommodate such components. In an example, the recessed area 206 includes a recliner gear system area 208 which is surrounded by a first edge 210a, a second edge 210b, and a third edge 210c. In the illustrated scenario, the first edge 210a is closer to the front surface 202a than to the rear surface 202b of the seat frame 202. Further, the second edge 210b is closer to the rear surface 202b than to the front surface 202a of the seat frame 202. Furthermore, the third edge 210c extends between the first edge 210a and the second edge 210b and is adjacent to the lower surface 202f of the seat frame 202. As may be understood, the recliner recessed area 208 is configured to house a recliner gear assembly, similar to the recliner support assembly 116a or 116b of the seat back 102 shown in FIG. 1A.

The seat frame 202 also includes a panel 212 that covers a portion of the first central opening 204 when the seat frame 202 is assembled to manufacture the vehicle seat. The seat frame 202 also includes a trim trench 214 that facilitates the mounting of upholstery on the seat frame 202. In an example, the trim trench 214 is a groove that extends positioned along an edge between the upper surface 202e and the rear surface 202b and covers a portion of the first central opening 204. The constructional details of the trim trench 214 are illustrated in the portion 2-2 in FIG. 2. The trim trench 214 includes a first portion 216, which defines a profile of the groove. The trim trench 214 also includes a second portion 218 that defines an opening of the trim trench 214. In the illustrated example, the first portion 216 is closer to a front surface 202a than the rear surface 202b of the seat frame 202. During the installation, a portion of the upholstery is inserted into the first portion 216 and is sewed through the second portion 218. Further, to accommodate the portion of the upholstery, the first portion 216 has a larger area than the second portion 218.

Figure 3A:
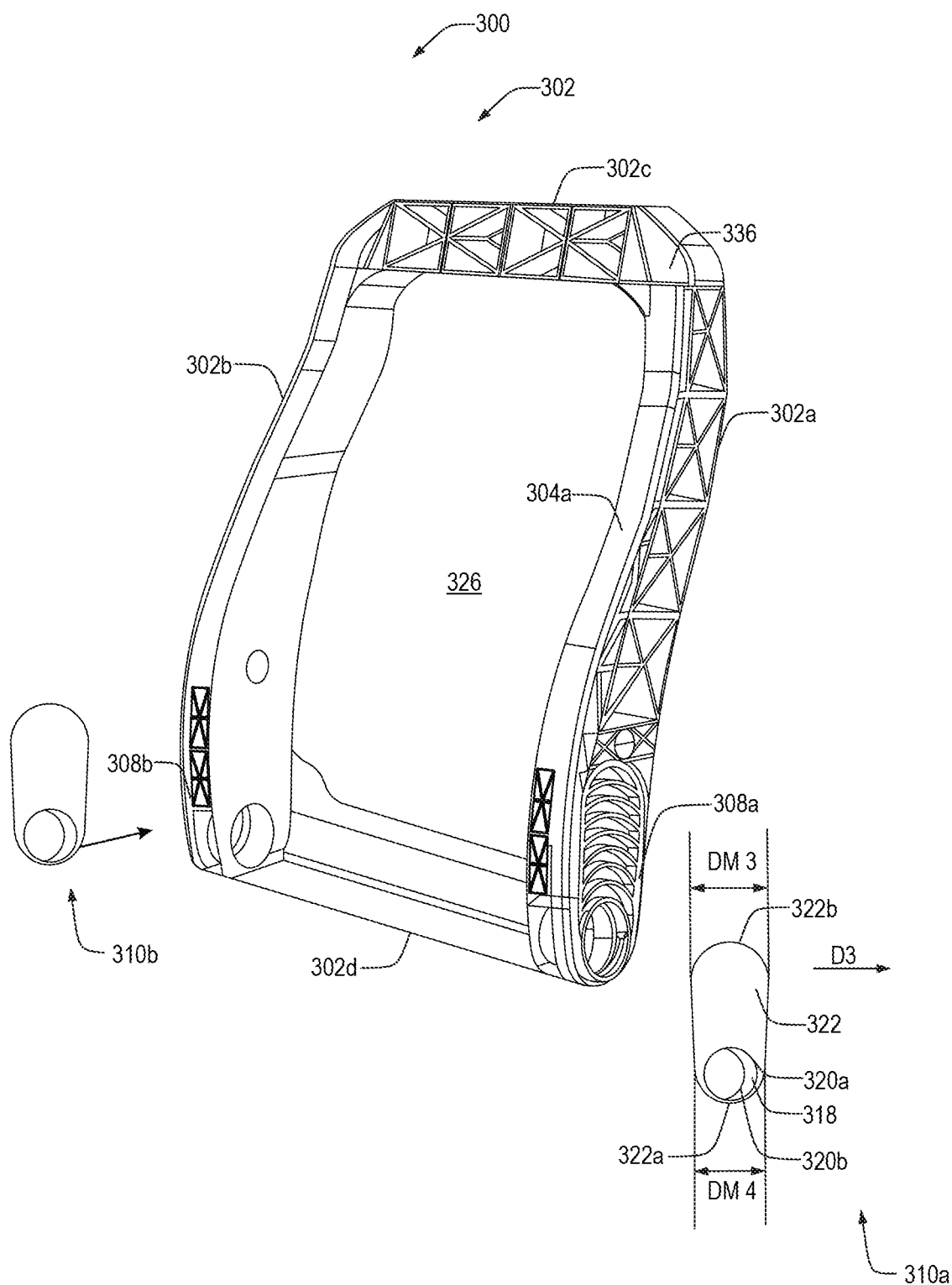
FIG. 3A illustrates an exploded view of another seat back having a seat frame with reclining mechanisms attached to a lower portion of the seat back in accordance with the present disclosure
Figure 3B:
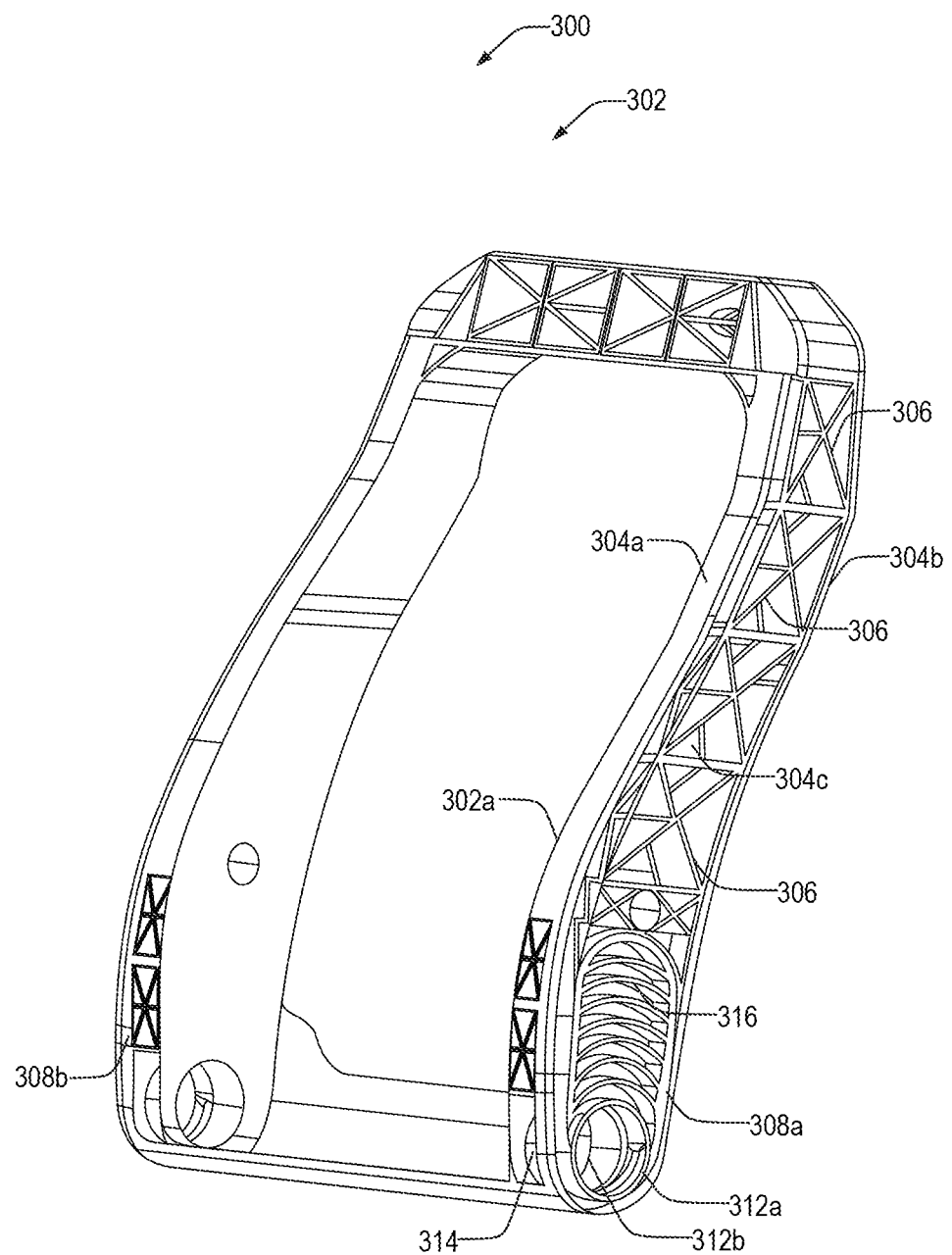
FIG. 3B illustrates a perspective front view of the seat back shown in FIG. 3A.
Figure 3C:
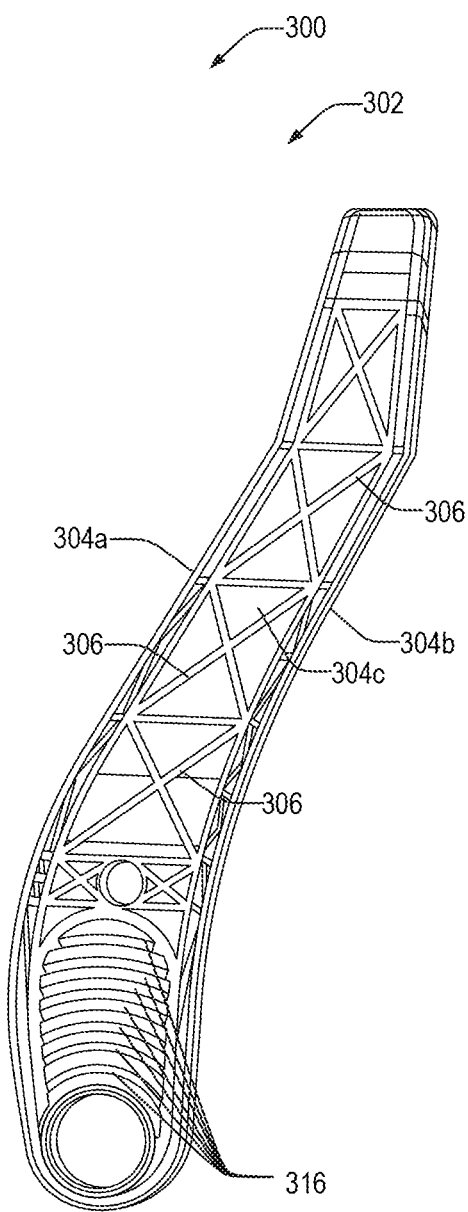
FIG. 3C illustrates a side view of the seat back shown in FIG. 3A.
Figure 3D:
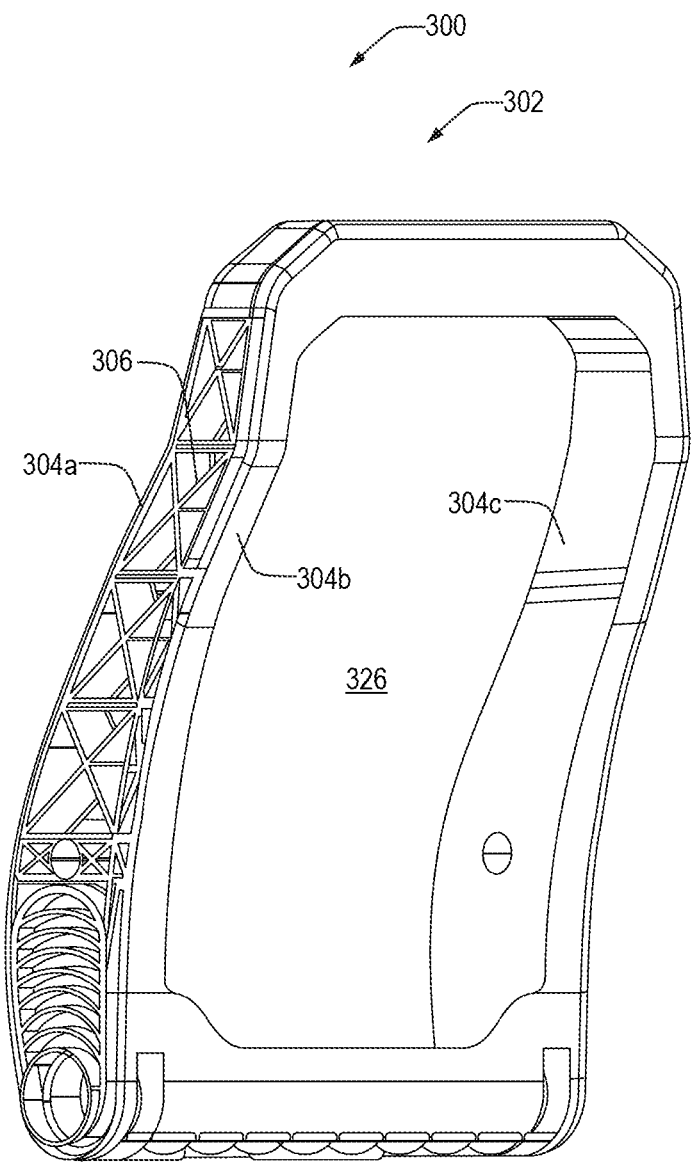
FIG. 3D illustrates a perspective back view of the seat back shown in FIG. 3A in accordance with an embodiment of the present disclosure.
Figure 3E:
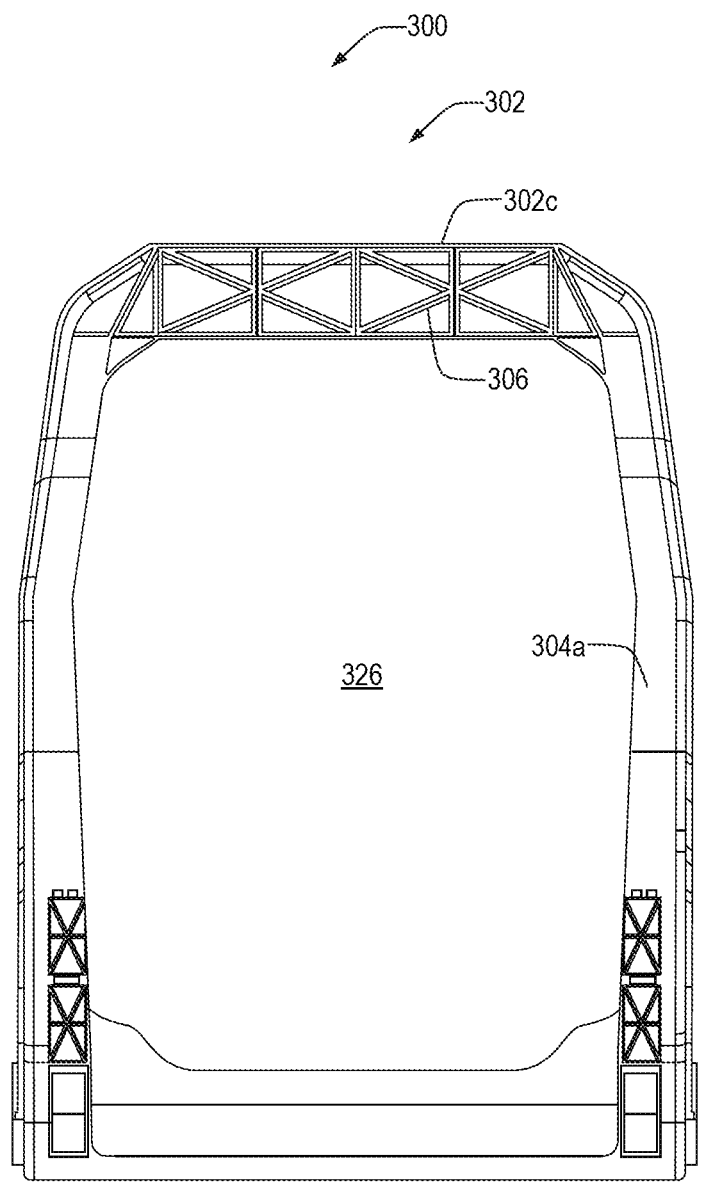
FIG. 3E illustrates a front view of the seat back shown in FIG. 3A in accordance with an embodiment of the present disclosure.
Figure 3F:
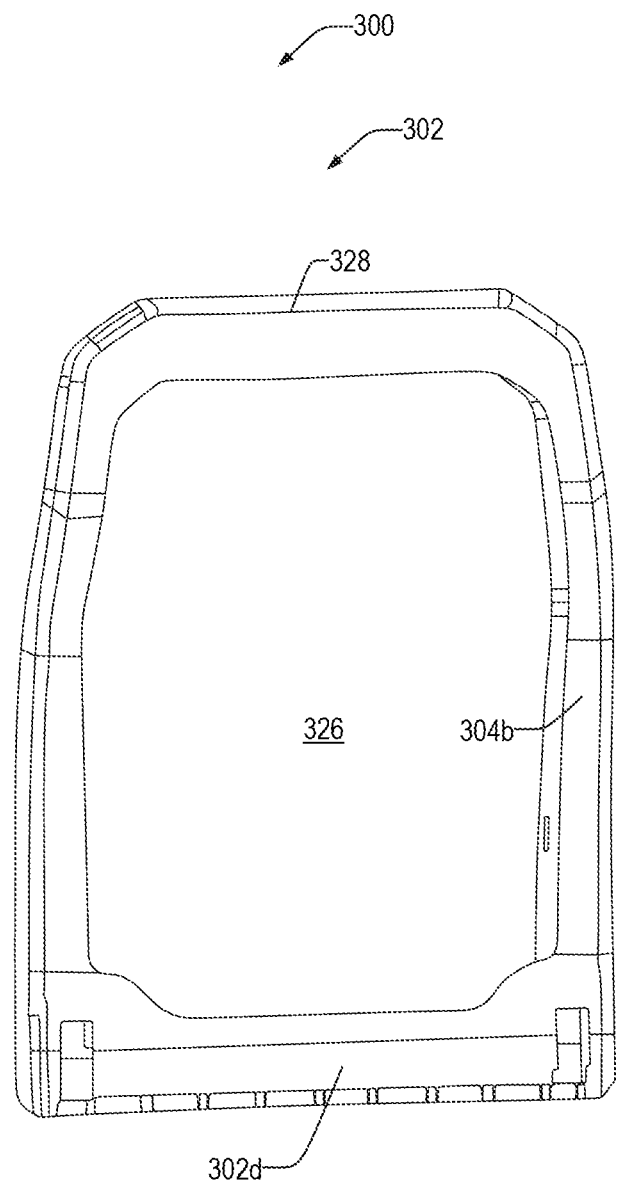
FIG. 3F illustrates a back view of the seat back in accordance with an embodiment of the present disclosure.

FIG. 3A through 3F illustrate yet another device 300 having a seat frame 302 for deployment in the vehicle in accordance with an embodiment of the present disclosure. Specifically, FIG. 3A illustrates an exploded view of seat frame 302 of the device 300 with reclining mechanisms attached to a lower portion of the seat back while FIG. 3B illustrates a perspective front view of the assembled seat frame 302 shown in FIG. 3A in accordance with an embodiment of the present disclosure. FIG. 3C illustrates a side view of the seat frame 302 shown in FIG. 3A while FIG. 3D illustrates a perspective back view of the seat frame 302 in accordance with an embodiment of the present disclosure. Further, FIG. 3E illustrates a front view of the seat frame 302 while FIG. 3F illustrates a back view of the seat frame 302. The seat frame 302 is similar to the seat back 102 shown in FIG. 1A.

Like the seat back 102 of FIG. 1A, the seat frame 302 shown in FIG. 3A includes a first side 302a, a second side 302b, a top side 302c, and a bottom side 302d, albeit in a different configuration. Each of the sides 302a, 302b, 302c, 302d includes a front wall 304a, a back wall 304b, and a side wall 304c, shown in FIGS. 3B, 3C, 3D, 3E, and 3F, that together define a structure thereof. Moreover, each side 302a, 302b, 302c, 302d includes a plurality of ribs 306 that provide structural support to the sides 302a, 302b, 302c, 302d. In an example, the plurality of ribs 306 is housed within the front wall 304a, the back wall 304b, and the side wall 304c, as shown clearly in FIGS. 3C and 3D. As illustrated, the plurality of ribs 306 extends along a portion of the length of the first side 302a and the second side 302b.

As shown in FIGS. 3A and 3B, the seat frame 302 also includes a pair of recesses 308a and 308b at a lower portion of the first side 302a and the second side 302b, respectively. Each recess 308a and 308b includes a cavity that receives a recliner support assembly 310a and 310b of the seat frame 302. Further, the first recess 308a includes a second side opening 312a and a second opening 312b positioned at a lower end of the first side 302a defining a cylindrical tunnel 314 extending across a width of the first recess 308a, as shown in FIG. 3B. As shown in FIG. 3A, the same cylindrical tunnel is also formed on the second side 302b. Referring back to FIG. 3B, the first recess 308a also includes a plurality of curved ribs 316 that extends along a length of the first recess 308a. The plurality of curved ribs 316, in an example, allows mounting of the first recliner support assembly 310a. As may be understood, the second recess 308b may have a similar structure.

The structure of the first recliner support assembly 310a is now described with respect to FIG. 3A. The first recliner support assembly 310a includes a cylindrical body 318 that forms the main body of the first recliner support assembly 310a. The cylindrical body 318 includes a pair of openings namely a second opening 320a and a third opening 320b that define the ends of the cylindrical body 318. When installed in the first recess 308a, the third opening 320b of the first recliner support assembly 310a is aligned with the second side opening 312a of the first recess 308a.

The body 318 includes an extension 322 that extends away from the second opening 320a and the third opening 320b towards the top side 302c of the seat frame 302. The extension 322 includes a first end or a first curved end 322a that is formed proximate to the bottom side 302d of the seat frame 302 when installed in the first recess 308a. In addition, the extension 322 includes a second end or a second curved end 322b that is opposite to the first curved end 322a and is spaced from the first curve end 322a by an extension 322.

In an example, the first curved end 322a has a first dimension DM3 in a first direction D3 while the second curved end 322b has a second dimension DM4 in the first direction D3. Further, the first dimension DM3 is greater than the second dimension DM4 resulting in a tapered profile of the extension 322. The dimensions of the first curved end 322a and the second curved end 322b is determined based on the dimensions of the first recess 308a. For instance, the dimensions DM3 and DM4 of the first curved end 322a and the second curved end 322b are kept in such a way that the first curved end 322a and the second curved end 322b have a flush fit with inner edges of the first recess 308a when the first curved end 322a and the second curved end 322b are installed inside the first recess 308a.

The extension 322 also includes edges and ends that, when installed, abut the boundaries of the first recess 308a. On the other hand, in case the extension 322 is mounted in the recessed area 206 of FIG. 2, the edges of the extension 322 will be adjacent to the first edge 210a, the second edge 210b, and the third edge 210c. The first recliner support assembly 310a also includes a recliner gear system (not shown) that may have the same structure as the recliner gear system 130 of the seat back 102.

In one scenario, the seat frame 302 includes a first central opening 326 formed by the first side 302a, the second side 302b, the top side 302c, and the bottom side 302d. The first central opening 326 extends between the front wall 304a (shown in FIG. 3E) to the back wall 304b (shown in FIG. 3F) along a thickness of the seat frame 302. In addition, the seat frame 302 includes a trim trench 328 that is formed around the first central opening 326 as shown in FIG. 3F. The trim trench 328 is provided to allow easy mounting of upholstery onto the seat frame 302. The structure of the trim trench 328 is similar to that of the trim trench 214 illustrated in FIG. 2.

A device may be summarized as including a seat back that includes a composite body having a first side and a second side. The seat back also includes a first extension along the first side of the composite body, a second extension along the second side of the composite body, and a first recliner assembly coupled to the first extension and a second recliner assembly coupled to the second extension. The first and second extensions are stamped steel and are over molded with the composite body. Further, the first bracket and the second bracket are welded to respective ones of the first and second extensions. Each of the first and second recliner assembly includes a first bracket, a second bracket and recliner gears.

The first side of the composite body has a first dimension in a first direction, the first extension has a second dimension in the first direction, the first dimension being greater than the second dimension.

The composite body includes an upper region that is coupled to the first and second sides, the upper body region including a first overhang that extends toward the first side and a second overhang that extends toward the second side. The first extension abuts the first overhang and an upper end of the first extension faces a bottom surface of the first overhang The first extension is less than half a dimension of the first side of the composite body. In an embodiment, a dimension of the first extension is less than one third a dimension of the first side of the composite body.

The first and second sides include a first and second recess, respectively, the first and second recess being positioned closer to a bottom side of the body than a top side. Further, the first extension is positioned in the first recess. The first side includes a first opening, the first extension includes a second opening, the first recliner assembly includes a recliner assembly that is positioned in the first and second openings.

A device may also be summarized as including a seat frame that includes a first central opening, a first side, a second side, a top side that extends between the first and second sides, a bottom side that extends between the first and second sides, a rear surface, a first recess in the first side, and a second recess in the second side; a first recliner support assembly in the first recess; and a second recliner support assembly in the second recess. Further, the rear surface includes a trim trench that at least partially surrounds the first central opening.

The first recess includes a second side opening, the first support assembly including a third opening that is aligned with the second opening; an extension that extends away from the third opening; and a recliner gear system in the second and third opening.

The first recliner support assembly includes a second opening; a first curved end; an extension extending from the second opening toward the top side, the extension including the first curved end; and a second curved end spaced from the first curved end by the extension and the second opening.

The first curved end includes a first dimension in a first direction and the second curved end includes a second dimension in the first direction, the first dimension being greater than the second dimension.

The first and second sides each include a plurality of ribs and the first and second sides include a plurality of curved ribs.

A device may be summarized as including a seat frame that includes a front surface; a rear surface; an upper surface; a lower surface; a central opening that extends from the front surface to the rear surface; a first side surface that includes a recessed area; and a first recliner assembly in the recess area.

The recessed area includes a first edge that is closer to the front surface than the rear surface, a second edge that is adjacent to the lower surface, and a third edge that is closer to the upper surface than the lower surface, the first edge extending between the first and second edge; a recliner gear system area in the recessed area, the recliner gear system area being closer to the lower surface than the upper surface, the recessed area extends from the recliner gear system area toward the upper surface; and a first recliner assembly in the recess area.

The first recliner assembly includes an extension that includes edges adjacent to the first edge, the second edge, and the third edge of the recess recliner assembly area; and a recliner gear system coupled to the extension and positioned in the recliner gear system area of the first side surface.

The extension includes a first curved end that is opposite to a second curved end, an opening that is closer to the second curved end; the recliner gear system being in the opening. The extension also includes a first end that is adjacent to the third edge of the recessed area and a second end that is adjacent to the second edge of the recessed area, the first end having a first dimension between the front and rear surface and the second end having a second dimension between the front and rear surface, the first dimension being less than the second dimension.

The rear surface includes a trim trench that further includes a first portion that is closer to the front surface than a second portion, the first portion having a larger area than the second portion.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A seat back, comprising:
a composite body having a first side and a second side;
a first extension along the first side of the composite body;
a second extension along the second side of the composite body;
a first recliner assembly coupled to the first extension and a second recliner assembly coupled to the second extension; and
an upper region of the composite body that is coupled to the first and second sides, the upper region including a first overhang that extends toward the first side and a second overhang that extends toward the second side, wherein the first overhang extends over the first side, wherein the second overhang extends over the second side, wherein the first extension abuts the first overhang, and wherein an upper end of first extension faces a bottom surface of the first overhang.

2. The seat back of claim 1 wherein the first and second extensions are stamped steel and are over molded with the composite body.

3. The seat back of claim 1 wherein a first bracket and a second bracket are welded to respective ones of the first and second extensions.

4. The seat back of claim 1 wherein the first extension is less than half a dimension of the first side of the composite body.

5. The seat back of claim 1 wherein a dimension of the first extension is less than one third a dimension of the first side of the composite body.

6. The seat back of claim 1 wherein each first and second recliner assembly includes:
a first bracket;
a second bracket; and
recliner gears.

7. A seat back, comprising:
a composite body having a first side and a second side;
a first extension along the first side of the composite body;
a second extension along the second side of the composite body;
a first recliner assembly coupled to the first extension and a second recliner assembly coupled to the second extension; and
an upper region of the composite body that is coupled to the first and second sides, the upper region including first overhang that extends toward the first side and a second overhang that extends toward the second side, wherein the first overhang extends over the first side, wherein the second overhang extends over the second side, wherein the first second side include a first and second recess, respectively, the first and second recess being positioned closer to a bottom side of the body than a top side, the first extension is positioned in the first recess.

8. The seat back of claim 7 wherein the first side includes a first opening, the first extension includes a second opening, the first recliner assembly includes a recliner assembly that is positioned in the first and second openings.

9. A seat back, comprising:
a seat frame that includes:
a first central opening defined by the seat frame;
a first side;
a second side;
a top side that extends between the first and second sides;
a bottom side that extends between the first and second sides;
a rear surface;
a first recess in the first side, wherein the first recess includes a first side opening, and wherein the recess increases in width from the first side opening toward the top side; and
a second recess in the second side, wherein the second recess includes a second side opening, and wherein the recess increases in width from the second side opening toward the top side;
a first recliner support assembly is disposed in the first recess, wherein the first recliner support assembly includes:
a third opening that is aligned with the first side opening;
a first extension that extends away from the third opening; and
a recliner gear system in the first side opening and third opening; and
a second recliner support assembly is disposed in the second recess, wherein the second recliner support assembly includes:
a fourth opening that is aligned with the second side opening;
a second extension that extends away from the fourth opening; and
a recliner gear system in the second side opening and fourth opening.

10. The seat back of claim 9 wherein the rear surface includes a trim trench that at least partially surrounds the first central opening.

11. The seat back of claim 10 wherein the first recliner support assembly includes:
the second opening;
a first curved end;
an extension extending from the second opening toward the top side, the extension including the first curved end; and
a second curved end spaced from the first curved end by the extension and the second opening.

12. The seat back of claim 11 wherein the first curved end includes a first dimension in a first direction and the second curved end includes a second dimension in the first direction, the first dimension being greater than the second dimension.

13. The seat back of claim 10 wherein the first and second sides each include a plurality of ribs and the first and second sides include a plurality of curved ribs.

14. A seat back, comprising:
a seat frame that includes:
a front surface; a rear surface;
an upper surface;
a lower surface;
a central opening that extends from the front surface to the rear surface;
a first side surface that includes:
a recessed area that includes:
a first edge that is closer to the front surface than the rear surface;
a second edge that is closer to the rear surface than to the front surface; and
a third edge that is adjacent to the lower surface, the third edge extending between the first and second edge; and
a recliner gear system area in the recessed area, the recliner gear system area being closer to the lower surface than the upper surface, wherein the first edge, the second edge, and the third edge surround the recliner gear system, wherein the recessed area extends from the recliner gear system area toward the upper surface, and wherein the recliner gear system houses a first recliner assembly in the recessed area.

15. The seat back of claim 14 wherein the first recliner assembly includes:
an extension that includes edges adjacent to the first edge, the second edge, and the third edge of the recess recliner assembly area; and
a recliner gear system coupled to the extension and positioned in the recliner gear system area of the first side surface, the extension includes a first curved end that is opposite to a second curved end, an opening that is closer to the second curved end; and the recliner gear system being in the opening.

16. The seat back of claim 15 wherein the extension includes a first end that is adjacent to the third edge of the recessed area and a second end that is adjacent to the second edge of the recessed area, the first end having a first dimension between the front and rear surface and the second end having a second dimension between the front and rear surface, the first dimension being less than the second dimension.

17. The seat back of claim 14 wherein the rear surface includes a trim trench, the trim trench includes a first portion that is closer to the front surface than a second portion, the first portion having a larger area than the second portion.

* * * * *